US008951945B2

(12) United States Patent
Yoshizaki et al.

(10) Patent No.: US 8,951,945 B2
(45) Date of Patent: Feb. 10, 2015

(54) ROLLING BEARING (75) Inventors: Koji Yoshizaki, Osaka (JP); Kunihiro Yamaguchi, Osaka (JP); Komatsugu Nishimura, Osaka (JP); Michiru Ueda, Osaka (JP); Hiroki Iwamatsu, Kobe (JP); Masashi Mitsuoka, Kobe (JP)

(73) Assignees: JTEKT Corporation, Osaka-shi (JP); Nippon Grease Co., Ltd., Osaka-shi (JP)

( * ) Notice: Subject to any disclaimer, the term of this patent is extended or adjusted under 35 U.S.C. 154(b) by 267 days.

(21) Appl. No.: 13/445,153

(22) Filed: Apr. 12, 2012

(65) Prior Publication Data
US 2012/0269472 A1 Oct. 25, 2012

(30) Foreign Application Priority Data

Apr. 21, 2011 (JP) .................. 2011-095420

(51) Int. Cl.
*C10M 115/08* (2006.01)
*F16C 19/00* (2006.01)
*C10M 169/06* (2006.01)
(Continued)

(52) U.S. Cl.
CPC .......... *C10M 169/06* (2013.01); *F16C 33/6633* (2013.01); *C10M 2207/0406* (2013.01); *C10M 2215/1026* (2013.01); *C10M 2219/066* (2013.01); *C10M 2219/068* (2013.01); *C10M 2227/09* (2013.01); *C10N 2210/02* (2013.01); *C10N 2210/05* (2013.01); *C10N 2230/06* (2013.01); *C10N 2240/02* (2013.01); *C10N 2250/10* (2013.01); *F16C 19/06* (2013.01)
USPC .......................................... 508/552; 384/462

(58) Field of Classification Search
USPC .......................................... 508/552; 384/462
See application file for complete search history.

(56) References Cited

U.S. PATENT DOCUMENTS 4,668,411 A * 5/1987 Yasui et al. ............ 508/552
6,432,888 B1 8/2002 Komiya
(Continued)

FOREIGN PATENT DOCUMENTS

DE 100 16 845 5/2001
JP 58-185693 10/1983
(Continued)

OTHER PUBLICATIONS

Extended European Search Report issued in corresponding application No. 12163346.5 dated Jul. 4, 2012 (6 pages).

*Primary Examiner* — Vishal Vasisth
(74) *Attorney, Agent, or Firm* — Kratz, Quintos & Hanson, LLP (57) ABSTRACT

There is provided a rolling bearing which inhibits spalling of a rolling element and has a long service life even under rigorous environments. The rolling bearing comprises grease for lubricating rolling contact parts and/or sliding contact parts between a first raceway surface and a rolling elements and/or between a second raceway surface and a rolling elements, wherein the grease comprises a base oil, a thickener and an extreme pressure additive, the thickener is a diurea compound obtained by allowing an amine mixture comprising alkylphenylamine, alkyl group of which has 8 to 16 carbon atoms, and cyclohexylamine, to react with a diisocyanate compound, an amount of cyclohexylamine in the total amount of the alkylphenylamine and cyclohexylamine is from 91 to 99% by mole, and a reaction temperature of the extreme pressure additive with iron is 260° C. or lower.

6 Claims, 3 Drawing Sheets

(51) Int. Cl.
*F16C 33/66* (2006.01)
*F16C 19/06* (2006.01)

(56) References Cited

U.S. PATENT DOCUMENTS 7,696,139 B2 * 4/2010 Okamura et al. ............ 508/552

2005/0043190 A1 2/2005 Komiya et al. ............... 508/183

FOREIGN PATENT DOCUMENTS

| JP | 61-155496 | A | 7/1986 |
| JP | 2-242696 | A | 9/1990 |
| JP | 3512183 | B2 | 3/2004 |
| JP | 4102627 | B2 | 6/2008 |

* cited by examiner

ROLLING BEARING

INCORPORATION BY REFERENCE

The disclosure of Japanese Patent Application No. 2011-095420 filed on Apr. 21, 2011 including the specification, drawings and abstract, is incorporated herein by reference in its entirety.

TECHNICAL FIELD

The present invention relates to a rolling bearing with a specific grease.

BACKGROUND OF THE INVENTION

Bearings for electrical parts of automobiles such as an alternator; an electromagnetic clutch for a car air conditioner, an intermediate pulley and an electric fan motor, auxiliaries of engine and the like are used under severe environments such as high temperature, high speed, high load and vibration environment. In the bearings used in such severe environments, spalling of the fixed ring surface of the bearing is recognized in a period of time being as extremely short as 1/10 or less of a calculated service life theoretically estimated. It is known that the reason for this is such that an excessive tangential force as well as slipping arises under severe working conditions between the roiling element and the rolling contact surfaces of the inner and outer rings, thereby causing the spalling in an early stage of the use.

In this connection, grease for solving such a problem as mentioned above has been reported. For example, JP 61-155496 A discloses grease prepared using, as a thickener, a diurea compound obtained by allowing an amine mixture comprising alkylphenylamine, an alkyl group of which has 8 to 16 carbon atoms, and cyclohexylamine in a molar ratio of 1:9 to 9:1, to react with a diisocyanate compound. Also, JP 3512183 B and JP 4102627 B disclose grease comprising a specific extreme pressure additive.

SUMMARY OF THE INVENTION

However, recently working conditions of bearings have become further severe, and a grease film is hardly formed on rolling contact parts and a tangential force is increased while a film of extreme pressure additive is hardly formed on the surface of the rolling element undergoing the rolling at random in the bearing differently to the fixed ring. As a result, spalling of the rolling element sporadically occurs earlier.

It was found that by the use of a rolling bearing containing grease comprising a base oil, a specific thickener and a specific extreme pressure additive, a grease film on the surface of the rolling element can be made thicker, this thickness is maintained for a long period of time, and an extreme pressure additive film having a sufficient thickness is formed, and an object of the present invention is to provide a rolling bearing which inhibits spalling of the rolling element surface and has a long service life even under severe environments.

A rolling bearing of the present invention is a rolling bearing featured by comprising: a first race member having a first raceway surface, a second race member having a second raceway surface, a plurality of rolling elements rotatably arranged between the first raceway surface and the second raceway surface, and grease for lubricating rolling contact parts and/or sliding contact parts between the first raceway surface and the rolling elements and/or between the second raceway surface and the rolling elements, wherein the grease comprises a base oil, a thickener and an extreme pressure additive, the thickener is a diurea compound obtained by allowing an amine mixture comprising alkylphenylamine, an alkyl group of which has 8 to 16 carbon atoms, and cyclohexylamine, to react with a diisocyanate compound, an amount of cyclohexylamine in the total amount of alkylphenylamine, an alkyl group of which has 8 to 16 carbon atoms, and cyclohexylamine is from 91 to 99% by mole, and a reaction temperature of the extreme pressure additive with iron is 260° C. or lower.

The amount of the thickener is preferably from 9 to 36 parts by mass based on 100 parts by mass of the total amount of the base oil and the thickener.

A worked penetration of the grease is preferably 280 or more.

A worked penetration of the grease is preferably 300 or more.

In a test for measuring a thickness of a film of the grease using a steel ball rotating at a rolling rate of 0.03 m/s, the film thickness after a lapse of 20 minutes from starting of the rotation is preferably 150 nm or more.

EFFECT OF THE INVENTION

According to the present invention, a grease film on the surface of the rolling element can be made thicker, this thickness is maintained for a long period of time, and an extreme pressure additive film having a sufficient thickness is formed, and thereby, spalling of the rolling element surface can be inhibited and as a result, the rolling bearing having a long service life even under severe environments can be provided.

DETAILED DESCRIPTION

The rolling bearing of the present invention is a rolling bearing featured by comprising: a first race member having a first raceway surface, a second race member having a second raceway surface, a plurality of rolling elements rotatably arranged between the first raceway surface and the second raceway surface, and grease for lubricating rolling contact parts and/or sliding contact parts between the first raceway surface and the rolling elements and/or between the second raceway surface and the roiling elements, wherein the grease comprises a base oil, a thickener and an extreme pressure additive, the thickener is a diurea compound obtained by allowing an amine mixture comprising alkylphenylamine, an alkyl group of which has 8 to 16 carbon atoms, and cyclohexylamine, to react with a diisocyanate compound, an amount of cyclohexylamine in the total amount of alkylphenylamine, an alkyl group of which has 8 to 16 carbon atoms, and cyclohexylamine is from 91 to 99% by mole, and a reaction temperature of the extreme pressure additive with iron is 260° C. or lower.

Figure 1:
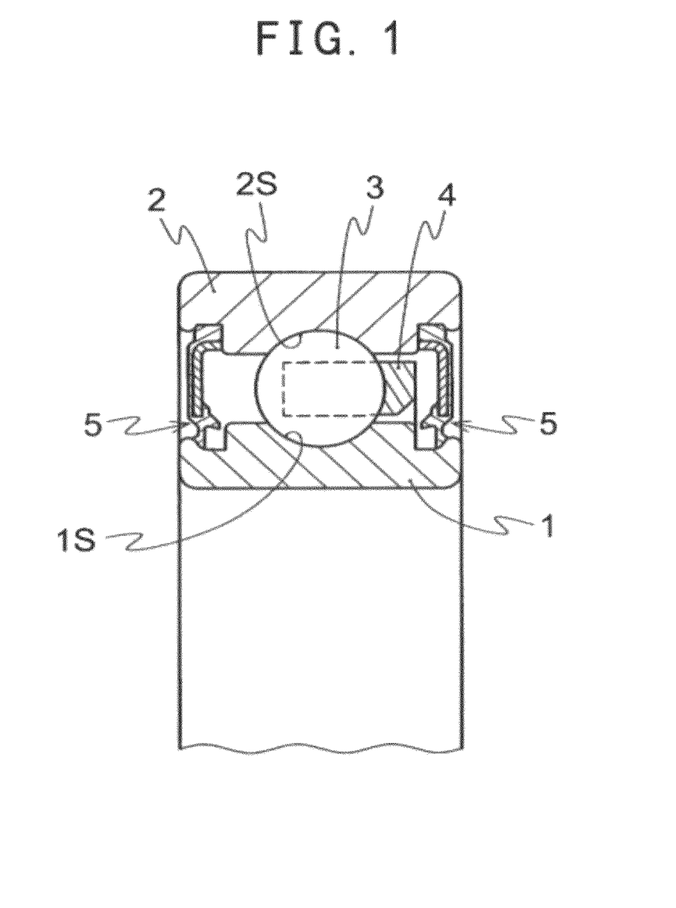
FIG. 1 is a partial cross-sectional view of the rolling bearing according to one embodiment of the present invention.

The rolling bearing of the present invention is explained below referring to the attached FIG. 1. FIG. 1 is a partial cross-sectional view of the rolling bearing according to one embodiment of the present invention, but the present invention is not limited to this embodiment. This rolling bearing comprises the first race member 1 (inner ring), the second race member 2 (outer ring), the rolling elements 3 (ball), a cage 4 for holding the rolling elements 3, and sealing members 5, and a space, which is surrounded by the first race member 1, the second race member 2 and the two sealing members 5 and in which the rolling elements 3 are provided, is formed.

The first race member has the first raceway surface, and the second race member has the second raceway surface, and the first race member and the second race member are arranged so that the first raceway surface is faced to the second raceway surface. A plurality of the rolling elements 3 are rotatably arranged between the first raceway surface and the second raceway surface at a given interval in a peripheral direction.

The sealing members 5 are provided at both ends in the axial direction of the space between the first race member 1 and the second race member 2. The outer end of the sealing member 5 is fixed to a stepped portion formed on an inner surface of the second race member 2, while the inner end of the sealing member 5 is slidably jointed to a groove formed on an outer surface of the first race member 1. These two sealing members demarcate a boundary line between the outside space and the space where the rolling elements 3 are provided, wherein the latter space includes rolling contact parts and/or sliding contact parts between the rolling elements and the first race member 1 and second race member 2.

Further, the rolling bearing of the present invention contains grease for lubricating rolling contact parts and/or sliding contact parts between the first raceway surface and the rolling elements and/or between the second raceway surface and the rolling elements. This grease is contained in the space where the rolling elements 3 are provided, and the space includes rolling contact parts and/or sliding contact parts between the rolling elements and the first race member 1 and second race member 2. This grease occupies a part of the space where the rolling elements 3 are provided. The above-mentioned two sealing members 5 inhibit the grease from leaking to the outside space from the space where the rolling elements 3 are provided, and inhibit foreign matters from invading into the space, where the rolling elements 3 are provided, from the outside space.

In the present invention, the grease comprises a base oil, a specific thickener and a specific extreme pressure additive.

The base oil is not limited particularly as far as it is a base oil to be usually used for grease, and it is possible to use one or two or more of, for example, mineral oils refined from crude oil by optional combination of treatments such as distillation under reduced pressure, solvent deasphalting, solvent extraction, hydrogenolysis, solvent dewaxing, washing with sulfuric acid, clay refining and hydrofinishing; synthetic diester oils, for example, dibutyl sebacate, di-2-ethylhexyl sebacate, dioctyl adipate, diisodecyl adipate, ditridecyl adipate, ditridecyl glutarate, methylacetyl ricinoleate, and the like; synthetic aromatic ester oils, for example, trioctyl trimellitate, tridecyl trimellitate, tetraoctyl pyromellitate, and the like; synthetic polyol ester oils, for example, trimethylolpropane caprylate, trimethylolpropane pelargonate, pentaerythritol-2-ethylhexanoate, pentaerythritol pelargonate, and the like; synthetic ester oils, for example, complex ester oils which are oligo esters of polyhydric alcohol and a fatty acid mixture of dibasic acid and monobasic acid; synthetic poly glycol oils, for example, polyethylene glycol, polypropylene glycol, polyethylene glycol monoether, polypropylene glycol monoether, and the like; synthetic phenyl ether oils, for example, monoalkyltriphenyl ether, alkyl diphenyl ether, dialkyl diphenyl ether, pentaphenyl ether, tetraphenyl ether, monoalkyl tetraphenyl ether, dialkyl tetraphenyl ether, and the like; synthetic hydrocarbon oils, for example, poly-α-olefins such as a co-oligomer of normal paraffin, isoparaffin, polybutene, polyisobutylene, 1-deceneoligomer or 1-decene with ethylene, or hydrides thereof; synthetic silicone oils, for example, dimethyl polysiloxane, diphenyl polysiloxane, alkyl-modified polysiloxane, and the like; and further, synthetic fluorine-containing oils, for example, perfluoro polyether. In particular, alkyl diphenyl ether oil is more preferred from the viewpoint of satisfactory formation of a grease film.

The thickener to be used in the present invention is a diurea compound which is a reaction product of an amine mixture prepared by mixing alkylphenylamine, an alkyl group of which has 8 to 16 carbon atoms, with cyclohexylamine, in a specific mixing ratio, and a diisocyanate compound.

In the specific alkylphenylamine as a component of the amine mixture, the number of carbon atoms of its alkyl group is from 8 to 16 from the viewpoint of being environmentally friendly, easily available and good in dispersibility. The number of carbon atoms of the alkyl group is further preferably from 10 to 14 from the viewpoint of being easily available and good in dispersibility. In addition, the alkyl group may be linear or branched, and in the phenyl group, the position substituted by the alkyl group may be any of ortho-position, meta-position or para-position. Specific examples thereof are, for example, one or two or more of octylaniline, decylaniline, dodecylaniline, hexadecylaniline, isododecylaniline and the like. From the viewpoint of good dispersibility, para-dodecylaniline is more preferred.

The amount of the above-mentioned cyclohexylamine is 91% by mole or more and 99% by mole or less in the total amount (100) of specific alkylphenylamine and cyclohexylamine, from the viewpoint of film forming property of the grease. A more preferred amount is 93% by mole or more, further 94% by mole or more from the viewpoint of good formation of a grease film, and 98% by mole or less, further 96% by mole or less similarly from the viewpoint of good formation of a grease film.

Aromatic diisocyanates are preferred as the diisocyanate compound to be allowed to react with the amine mixture, from the viewpoint of good heat resistance of the grease, and examples thereof are, for example, diphenylmethane-4,4'-diisocyanate, 2,4-trilenediisocyanate, 2,6-trilenediisocyanate, a mixture of 2,4-trilenediisocyanate and 2,6-trilenediisocyanate, 3,3'-dimethyldiphenyl-4,4'-diisocyanate, and the like. In particular, from the viewpoint of availability, diphenylmethane-4,4'-diisocyanate and 2,6-trilenediisocyanate are preferred, and further, diphenylmethane-4,4'-diisocyanate is preferred from the viewpoint of good heat resistance.

The reaction of the amine mixture with the diisocyanate compound can be carried out by various methods under various conditions, and it is preferable to carry out the reaction in the base oil since a diurea compound having highly uniform dispersibility can be obtained as the thickener. For example, the reaction may be carried out by adding the base oil containing the diisocyanate compound dissolved therein to the base oil in which the specific alkylphenylamine and cyclohexylamine have been dissolved, or by adding the base oil, in which the specific alkylphenylamine and cyclohexylamine have been dissolved, to the base oil containing the diisocyanate compound dissolved therein.

The reaction temperature and time in the above-mentioned reaction are not limited particularly, and may be the same as those used in usual similar reactions. The reaction temperature is preferably from 60° C. to 170° C. from the viewpoint, of solubility and volatility of the amine mixture and diisocyanate. The reaction time is preferably from 0.5 to 2.0 hours in view of improvement of production efficiency by shortening of the production period of time and also from the viewpoint of completing the reaction of the amine mixture and diisocyanate. The reaction of an amino group of the amine mixture and an isocyanate group of the diisocyanate compound proceeds quantitatively, and a preferred ratio thereof is 1 mole of the diisocyanate compound to 2 mole of the amine mixture.

The diurea compound which is a reaction product obtained by the above-mentioned reaction is a mixture of a diurea compound resulting from a reaction of both isocyanate groups of the diisocyanate compound with a cyclohexylamine or a specific alkylphenylamine in the amine mixture and a diurea compound resulting from a reaction of one isocyanate group of the diisocyanate compound with a cyclohexylamine in the amine mixture and a reaction of another isocyanate group with a specific alkylphenylamine. Here, the diurea compound resulting from a reaction of both isocyanate groups with a cyclohexylamine forms a relatively large thickener fiber, and has excellent properties such as shear stability and adhesion to an applied part. The diurea compound resulting from a reaction of both isocyanate groups with an alkylphenylamine forms a relatively small thickener fiber, and has an excellent property such as a property of intervening to an applied part. In the present invention, with respect to the mixture of diurea compounds, since the amount of the cyclohexylamine in the amine mixture used in the above-mentioned reaction is 91 to 99% by mole in the total amount of specific alkylphenylamine and cyclohexylamine, many of the diurea compounds are the diurea compounds resulting from a reaction of both isocyanate groups of the diisocyanate compound with a cyclohexylamine. It is assumed that in addition to these diurea compounds, by allowing a small amount of diurea compounds resulting from a reaction of both isocyanate groups with alkylphenylamine to be present, a thickness of the grease film on the surface of the rolling elements can be made thick and the grease film thickness is maintained for a long period of time.

The amount of the above-mentioned thickener in the grease is preferably 9 parts by mass or more and 36 parts by mass or less based on 100 parts by mass of the total amount of the base oil and the thickener. When the amount of the thickener is less than the lower limit, worked penetration of the grease tends to be excessively high, and when the amount of the thickener is larger than the upper limit, worked penetration of the grease becomes excessively low, and there is a tendency that a torque of the rolling bearing increases and bearing life is decreased because of seizure by lowering of flowability. A particularly preferred amount is 10 parts by mass or more, further 15 parts by mass or more, and 28 parts by mass or less, further 25 parts by mass or less, from the point that proper worked penetration can be obtained.

With respect to the extreme pressure additive to be used in the present invention, it is desirable that a film of the extreme pressure additive decreasing a tangential force at a contact portion is easily formed. Specifically a reaction temperature of the extreme pressure additive with iron is 260° C. or lower.

In the present invention, the reaction temperature of the extreme pressure additive with iron is a temperature showing an endothermic peak detected only in the case of using, as a sample, the extreme pressure additive and electrolytic iron powder when comparing an endothermic peak in the case of using, as a sample, only the extreme pressure additive (10 mg) with an endothermic peak in the case of using, as a sample, the extreme pressure additive and electrolytic iron powder by using a differential scanning calorimeter. Specifically the measurement is carried out with DSC3100SR available from Bruker Axs, Inc. as a differential scanning calorimeter by using, as a test sample, only the extreme pressure additive (10 mg) or the extreme pressure additive (10 mg) and electrolytic iron powder (50 mg) on the assumption that a standard sample is aluminum oxide ($Al_2O_3$), at a temperature elevating rate of 10° C./10 min within a temperature range from 40° C. to 300° C. and from 40° C. to 350° C., and a temperature showing an endothermic peak detected only in the case of using, as a sample, the extreme pressure additive and electrolytic iron powder can be used as a reaction temperature of the test sample (extreme pressure additive) with iron. The lower the temperature showing an endothermic peak is, the lower the reaction temperature of the extreme pressure additive with iron is. Namely, this indicates that the reactivity with iron is excellent. On the contrary, the higher the temperature showing an endothermic peak is, the higher the reaction temperature of the extreme pressure additive with iron is. Namely, this indicates that the reactivity with iron is inferior.

Examples of extreme pressure additives having a reaction temperature with iron of 260° C. or lower are antimony dithiocarbamate (SbDTC, reaction temperature with iron: 250° C.), ashless dithiocarbamate (ashless DTC, reaction temperature with iron: 240° C.), bismuth dibutyl dithiocarbamate (BiDTC, reaction temperature with iron: 253° C.), and the like.

The amount of the above-mentioned extreme pressure additive in the grease is preferably 0.1 part by mass or more and 5 parts by mass or less based on 100 parts by mass of the total amount of the base oil and the thickener. When the amount of the extreme pressure additive is less than 0.1 part by mass, there is a tendency that a property of forming a film of the extreme pressure additive at a contact part is lowered, and spalling of the rolling element surface cannot be inhibited. When the amount is larger than 5 parts by mass, hardening of a rubber portion of the sealing member tends to be accelerated.

In the present invention, various additives such as an antioxidant, an extreme pressure additive having a reaction temperature with iron exceeding 260° C., an antiwear additive, a dye, a color stabilizer, a viscosity improver, a structure stabilizer, a metal deactivator, a viscosity index improver and a rust-preventing additive may be added to the grease in proper amounts to such an extent not to impair the effect of the present invention. When these additives are contained in the grease, the amount thereof in the grease composition can be 10 parts by mass or less based on 100 parts by mass of the total amount of the base oil and the thickener.

In the present invention, the worked penetration of the grease is preferably 280 or more because channeling of the grease in the bearing is prevented and grease is sufficiently fed to the rolling contact surfaces and/or sliding contact surfaces, namely, by using a churning type grease, a grease film thickness becomes sufficient and spalling of the rolling element surface can be inhibited more. The worked penetration is more preferably 300 or more since the grease film thickness is increased and an effect of inhibiting the spalling is more excellent. In particular, the worked penetration is preferably 400 or less from the viewpoint of preventing leakage of the grease from the rolling bearing, namely, leakage to the outer space through a clearance between the sealing member and the first race member and/or the to second race member. In the present invention, the worked penetration is a value obtained by dropping a cone mounted on a cone penetration meter into the grease under environment of 25° C., measuring a depth (mm) of 5-second invasion of the cone into the grease, and then multiplying the measured depth by 10 in accordance is with JIS K2220-7.

In the present invention, the grease film thickness after a lapse of 20 minutes in the film thickness measuring test using steel ball of the bearing rotating at a rolling speed of 0.03 m/s is preferably 150 nm or more since the grease film formation on the surface of the rolling element is sufficient and spalling of the rolling element surface can be inhibited more, and the grease film thickness is more preferably 250 nm or more from the viewpoint of more excellent grease film forming property and satisfactory effect of inhibiting the spalling. Specific film thickness measuring test is as mentioned below.

The rolling bearing of the present invention contains the above-mentioned grease and has a long service life even under severe environments, and therefore, is preferably used as rolling bearings for electrical parts of automobiles such as an alternator, an electromagnetic clutch for a car air conditioner, an intermediate pulley and an electric fan motor, auxiliaries of engine and the like, which are used under severe environments such as high temperature, high speed and high load and vibration environment.

The present invention is explained below in detail by means of Examples, but is not limited to these Examples.

Measuring and testing methods are as follows.

(Measurement of Worked Penetration)

The worked penetration is a value obtained by dropping a cone mounted on a cone penetration meter into the grease under environment of 25° C., measuring a depth (mm) of 5-second invasion of the cone into the grease, and then multiplying the measured depth by 10 in accordance with JIS K2220-7.

(Film Thickness Measuring Test)

Figure 2:
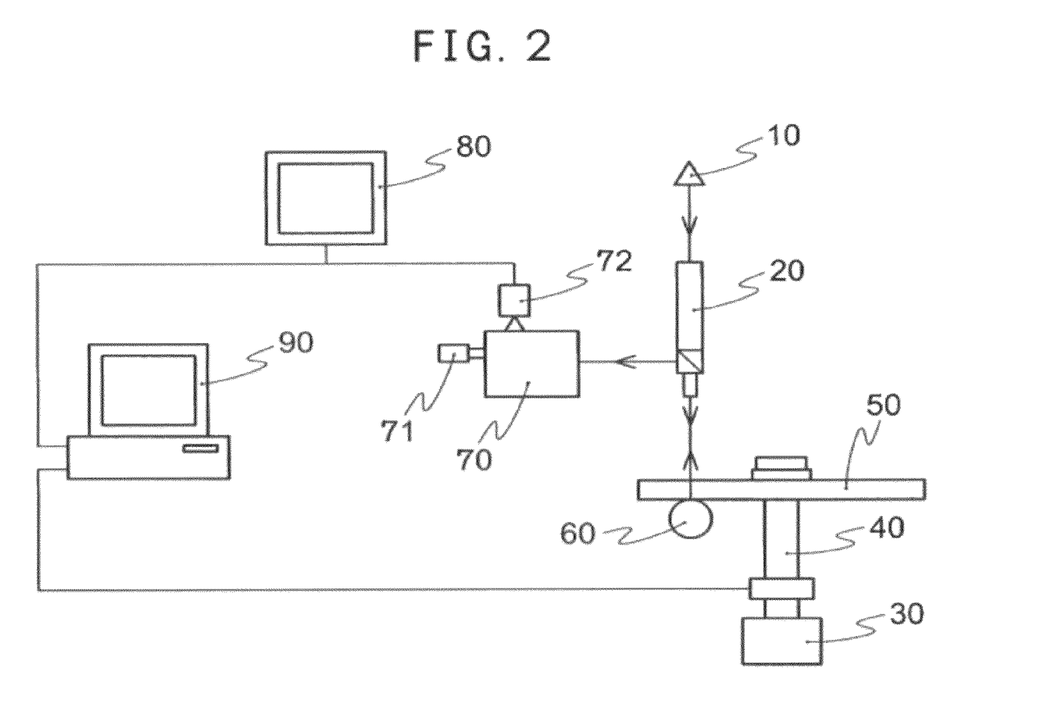
FIG. 2 is a diagrammatic view of an oil film thickness measuring system used in Examples.

Oil film forming property of sample grease is evaluated using an oil film thickness measuring device to which optical interferometry is applied and which is available from PCS Instruments. FIG. 2 is a diagrammatic view of the oil film thickness measuring system used. Light from the light source 10 is emitted, via the microscope 20, onto the surface of the disc 50 fixed to the spindle 40 rotating by power of the drive motor 30, in which the irradiated surface of the disc 50 is not in contact with the steel ball 60 of the bearing (See FIG. 2). The reflected light is measured using a spectrometer 70 provided with the micrometer 71 and the camera 72. The results of the measurement are displayed, analyzed and reserved on the monitor 80 and the computer 90 via the camera 72.

Figure 3:
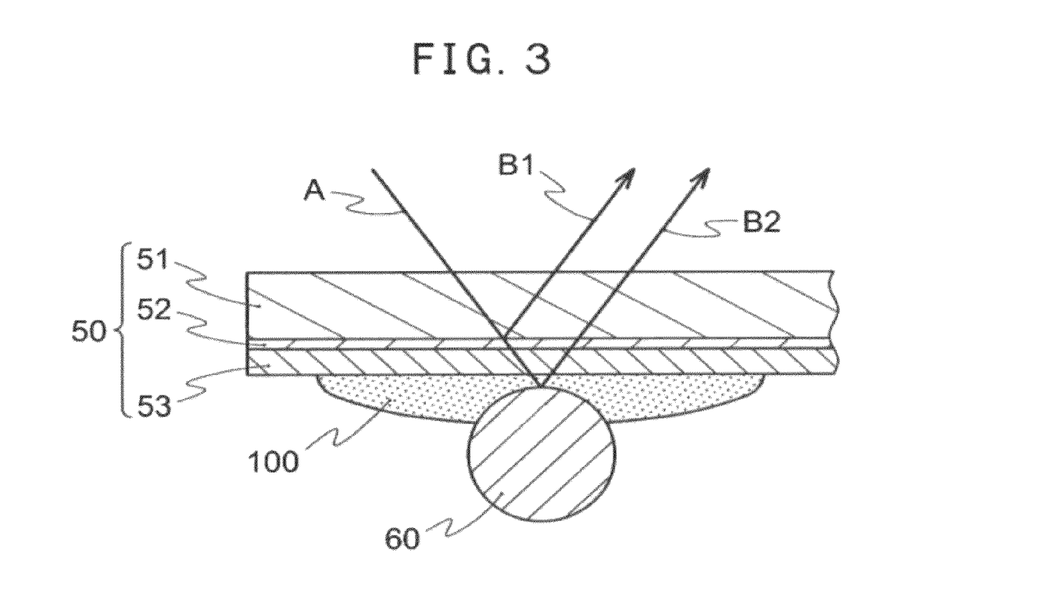
FIG. 3 is a diagrammatic cross-sectional view of a disc, sample grease and a steel ball when emitting light in an oil film thickness measuring device.

FIG. 3 is a diagrammatic cross-sectional view of the disc, sample grease and steel ball of the bearing when emitting light. As shown in FIG. 3, the disc 50 comprises the glass disc 51 and the chromium film 52 and silica film 53 deposited on one surface thereof, and the steel ball 60 of the bearing comes into contact with the surface of the silica film 53. The light is emitted onto the opposite surface of the disc (A), and a part of the emitted light is reflected on the chromium film surface (B1), and the remaining part of the light passes through the chromium film, the silica film and the sample grease 100 and reflected on the steel ball of the bearing (B2). Each, of the reflected light is measured using a spectrometer 70.

The testing method is concretely explained below. The sample grease 101 is applied on the surface of the disc comprising a hard glass having a diameter of about 10 cm and a chromium film and a silica film deposited on the hard glass in this order. The sample grease is applied in a film thickness of 1 mm on an area of the disc corresponding to the raceway of the ¾ inch diameter steel ball of the bearing using a template.

Figure 4:
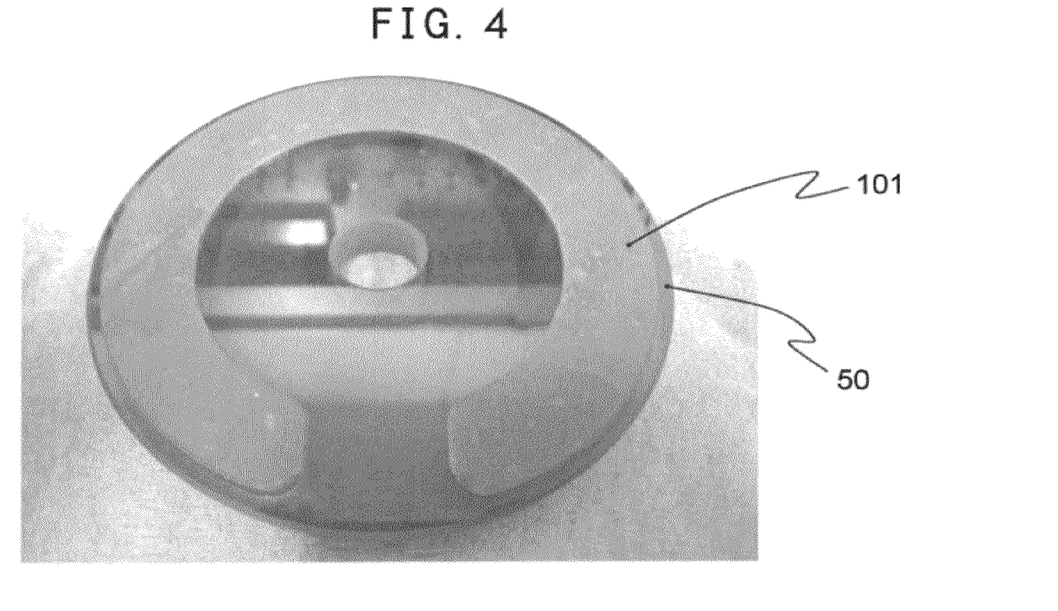
FIG. 4 is a photograph showing a state of sample grease applied on a disc.
Figure 5:
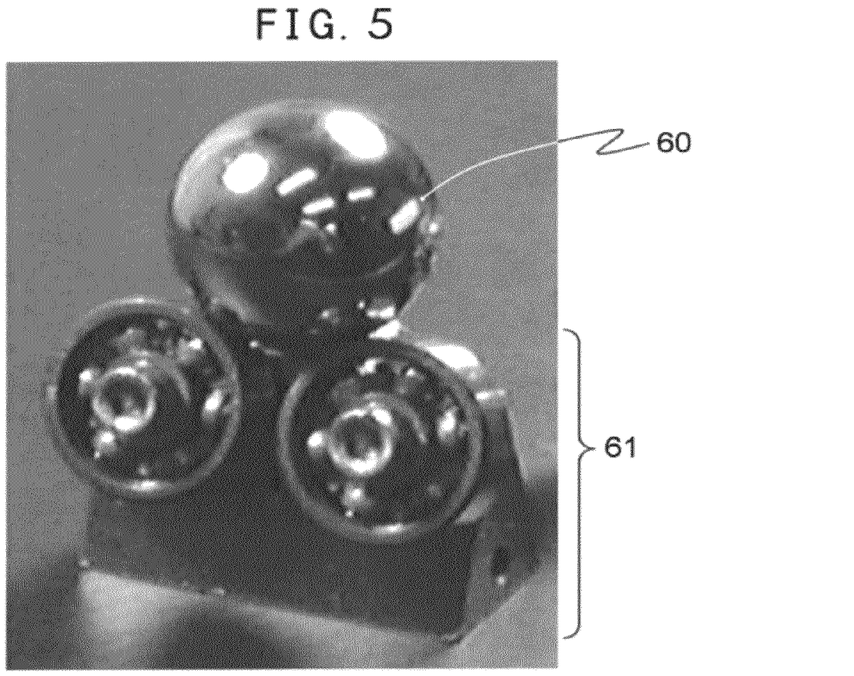
FIG. 5 is a photograph showing a state of a steel ball being placed on a pillow block.

In this case, as shown in FIG. 4, when the test is started, an area where the grease is not applied, namely, an area where the grease film thickness is zero, is left on the disc in order to measure only the thickness of the silica film. A pillow block for receiving the steel ball is prepared by combination of three small ball bearings being rotatable with a sufficiently small force, and as shown in FIG. 5, the ¾ inch diameter steel ball of the bearing is placed on the outer side of these three outer rings. The disc to which the sample grease was applied is fixed to the spindle, and the ¾ inch diameter steel ball of the bearing is set so as to come into contact with the grease-unapplied portion of the disc, and a load of 20 N is applied to the disc from under the pillow block for receiving the steel ball. First, in this state, only the thickness of the silica film between the chromium film and the ¾ inch diameter steel ball is measured by optical interferometry. Then, the spindle is rotated so that the rolling speed of the contacting raceway portion between the disc and the ¾ inch diameter steel ball becomes 0.03 m/s. During a period of time of 20 minutes from the starting of the rotation, the film thickness between the chromium film and the ¾ inch diameter steel ball, namely, the total of the silica film thickness and the sample grease film thickness is measured at intervals of one minute. The measurement of the film thickness is always carried out at the portion where only the thickness of the silica film was measured. A value obtained by subtracting the thickness of the silica film from the measured total thickness of the silica film and the sample grease film is assumed to be the grease film thickness. The sample grease is applied only before the test, and additional sample grease is not applied after starting the rotation of the disc. The test is carried out in the atmosphere of 25° C.

(Test for Spalling Life)

Operating Conditions

Bearing to be tested: Single-row deep groove ball bearing (inner diameter: 15 mm, outer diameter: 35 mm, width: 11 mm)

Number of revolutions: Cycle operation of 9,000 rpm for 5 sec and 18,000 rpm for 5 sec.

Radial load: 1 kN

Temperature: Room temperature (to be increased as operation proceeds)

Test is carried out under the above-mentioned operating conditions by using a sealed rolling bearing for testing which contains sample grease. A rotation period of time until spalling occurs on the rolling bearing and thereby a vibration level of the bearing increases over a normal level is measured, and the measured time is assumed to be a spalling generation time. The results of the evaluation is indicated as an index assuming that the spalling generation time of Comparative Example 1 is 100 (index of spalling life). The larger the index is, the longer the life is.

EXAMPLE

In Examples of the present invention, the following materials were used.

Diisocyanate compound
  MDI: Diphenylmethane-4,4'-diisocyanate
Amine
  CHA: Cyclohexylamine
  PDA: Para-dodecylaniline
Base Oil
  ADE: Alkyl diphenyl ether oil Extreme Pressure Additive SbDTC (antimony dithiocarbamate): VAN LUBE 73 (trade name) available from R.T. Vanderbilt Company, Inc. (reaction temperature with iron: 250° C.)

Ashless DTC (ashless dithiocarbamate): NA-LUBE ADTC (trade name) available from King Industries International Inc, (reaction temperature with iron: 240° C.)

BiDTC (bismuth dibutyl dithiocarbamate): One prepared by synthesis is used (reaction temperature with iron: 253° C.)

ZnDTC (zinc dithiocarbamate): VANLUBE AZ (trade name) available from R. T. Vanderbilt Company, Inc. (reaction temperature with iron: 307° C.)

Examples 1 to 6 and Comparative Examples 1 to 4

CHA and/or PDA was mixed in amounts shown in Tables 1 and 2 to ADE (base oil) being the same parts by mass as the starting amines as the thickener, and the mixture was heated to 100° C. to prepare a solution A. Separately, MDI was mixed in an amount shown in Tables 1 and 2 to ADE being the same parts by mass as the MDI as the thickener, and the mixture was heated to 140° C. to prepare a solution B. Next, another ADE for giving the amount of the thickener shown in Tables 1 and 2 was heated to 100° C. and then, thereto was added the solution A. Subsequently, while stirring the ADE containing the solution A, the solution B was added thereto slowly. Thereafter, the mixture was allowed to stand at 150° C. over 60 minutes, and then cooled to room temperature, and thereto was added 2 parts by mass of the extreme pressure additive shown in Tables 1 and 2 based on 100 parts by mass of the total amount of the base oil and the thickener, followed by homogenization treatment with a 3-roll mill to obtain sample grease. To the sample grease was added 2 parts by mass of an amine antioxidant based on 100 parts by mass of the total amount of the base oil and the thickener. With respect to the obtained sample grease, measurement of a worked penetration and test for measuring a film thickness were carried out. Also, 0.7 g of the obtained sample grease was filled in the above-mentioned test bearing and the bearing was sealed to make a test rolling bearing, and the test for spalling life was carried out. The results of the evaluation are shown in Tables 1 and 2.

TABLE 1

|  |  | Example | | | | Com. Ex. | |
| --- | --- | --- | --- | --- | --- | --- | --- |
|  |  | 1 | 2 | 3 | 4 | 1 | 2 |
| Starting material of thickener | MDI | 50 | 50 | 50 | 50 | 50 | 50 |
| (molar ratio) | CHA | 95 | 95 | 95 | 91 | 70 | 30 |
|  | PDA | 5 | 5 | 5 | 9 | 30 | 70 |
| Amount of thickener based on 100 parts by mass of the total amount of the base oil and the thickener (part by mass) |  | 35 | 20 | 10 | 20 | 16 | 16 |
| Extreme pressure additive |  | SbDTC | SbDTC | SbDTC | SbDTC | SbDTC | SbDTC |
| Results of evaluation |  |  |  |  |  |  |  |
| Worked penetration |  | 294 | 321 | 383 | 280 | 240 | 282 |
| Grease film thickness (nm) |  | 167 | 350 | 326 | 184 | 87 | 59 |
| Index of spalling life |  | 221 | 316 | 279 | 221 | 100 | 74 |

TABLE 2

|  |  | Example | | | Com. Ex. | |
| --- | --- | --- | --- | --- | --- | --- |
|  |  | 2 | 5 | 6 | 3 | 4 |
| Starting material of thickener | MDI | 50 | 50 | 50 | 50 | 50 |
| (molar ratio) | CHA | 95 | 95 | 95 | 95 | 95 |
|  | PDA | 5 | 5 | 5 | 5 | 5 |
| Amount of thickener based on 100 parts by mass of the total amount of the base oil and the thickener (part by mass) |  | 20 | 20 | 20 | 20 | 20 |
| Extreme pressure additive |  | SbDTC | ashless DTC | BiDTC | ZnDTC | not added |
| Results of evaluation |  |  |  |  |  |  |
| Worked penetration |  | 321 | 320 | 317 | 324 | 308 |
| Grease film thickness (nm) |  | 350 | 355 | 346 | 352 | 347 |
| Index of spalling life |  | 316 | 277 | 295 | 93 | 112 |

From the results shown in Table 1, it is seen that in Comparative Example 1, wherein the amount of CHA was 70% by mole in the total amount of CHA and PDA, and in Comparative Example 2, wherein the amount of CHA was 30% by mole in the total amount of CHA and FDA, a grease film was not sufficiently formed and inhibition of spalling was not enough. On the other hand, it can be seen that in Examples 1 to 3, wherein the amount of CHA was 95% by mole in the total amount of CHA and PDA, and in Example 4, wherein the amount of CHA was 91% by mole in the total amount of CHA and FDA, a grease film was sufficiently formed and spalling in the rolling bearing was inhibited.

From the results shown in Table 2, it is seen that in Comparative Example 3, wherein ZnDTC having a reaction temperature with iron of 307° C. was added as the extreme pressure additive, and in Comparative Example 4, wherein the extreme pressure additive was not added, a sufficient extreme pressure additive film was not formed and inhibition of spalling was not enough. On the other hand, it can be seen that in Example 2, wherein SbDTC having a reaction temperature with iron of 250° C. was added as the extreme pressure additive, in Example 5, wherein ashless DTC having a reaction temperature with iron of 240° C. was added, and in Example 6, wherein BiDTC having a reaction temperature with iron of 253° C. was added, a sufficient grease film and a sufficient extreme pressure additive film were formed and spalling in the rolling bearing was inhibited.

EXPLANATIONS OF SYMBOLS

1 First race member
1S First raceway surface
2 Second race member
2S Second raceway surface
3 Rolling element
4 Cage
5 Sealing member
10 Light source
20 Microscope
30 Drive motor
40 Spindle
50 Disc
51 Glass disc
52 Chromium film
53 Silica film
60 Steel ball of bearing
61 Pillow block for receiving steel ball
70 Spectrometer
71 Micrometer
72 Camera
80 Monitor
90 Computer
100 Sample grease
101 Sample grease
A Emitted light
B1 Reflected light
B2 Reflected light

What is claimed is:

1. A rolling bearing, comprising:
a first race member having a first raceway surface;
a second race member having a second raceway surface;
a plurality of rolling elements rotatably arranged between said first raceway surface and said second raceway surface; and
grease for lubricating rolling contact parts and/or sliding contact parts between said first raceway surface and said rolling elements and/or between said second raceway surface and said rolling elements,
wherein said grease comprises a base oil, a thickener and an extreme pressure additive, said thickener is a diurea compound obtained by allowing an amine mixture comprising alkylphenylamine, an alkyl group of which has 8 to 16 carbon atoms, and cyclohexylamine, to react with a diisocyanate compound,
an amount of said cyclohexylamine in the total amount of alkylphenylamine, an alkyl group of which has 8 to 16 carbon atoms, and cyclohexylamine, is from 93 to 99% by mole, and
a reaction temperature of said extreme pressure additive with iron is at most 260° C.

2. The rolling bearing according to claim 1, wherein a worked penetration of said grease is at least 280.

3. The rolling bearing according to claim 1, wherein a worked penetration of said grease is at least 300.

4. The rolling bearing according to claim 1, wherein in a test for measuring a thickness of a film of said grease using a steel ball rotating at a rolling rate of 0.03 m/s, the film thickness after a lapse of 20 minutes from starting of the rotation is 150 nm.

5. The rolling bearing according to claim 2, wherein in a test for measuring a thickness of a film of said grease using a steel ball rotating at a rolling rate of 0.03 m/s, the film thickness after a lapse of 20 from starting of the rotation minutes is at least 150 nm.

6. The rolling bearing according to claim 3, wherein in a test for measuring a thickness of a film of said grease using a steel ball rotating at a rolling rate of 0.03 m/s, the film thickness after a lapse of 20 minutes from starting of the rotation is at least 150 nm.

* * * * *